(12) United States Patent
Horsnell et al.

(10) Patent No.: US 11,615,032 B2
(45) Date of Patent: Mar. 28, 2023

(54) ADDRESS TRANSLATION DATA INVALIDATION

(71) Applicant: ARM LIMITED, Cambridge (GB)

(72) Inventors: Matthew James Horsnell, Cambridge (GB); Grigorios Magklis, Cambridge (GB); Richard Roy Grisenthwaite, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/625,102

(22) PCT Filed: Jun. 1, 2018

(86) PCT No.: PCT/EP2018/064497
§ 371 (c)(1),
(2) Date: Dec. 20, 2019

(87) PCT Pub. No.: WO2019/001896
PCT Pub. Date: Jan. 3, 2019

(65) Prior Publication Data
US 2020/0167292 A1    May 28, 2020

(30) Foreign Application Priority Data
Jun. 28, 2017    (EP) .................................... 17386022

(51) Int. Cl.
*G06F 3/06* (2006.01)
*G06F 12/1027* (2016.01)
(Continued)

(52) U.S. Cl.
CPC .......... *G06F 12/1027* (2013.01); *G06F 9/467* (2013.01); *G06F 9/544* (2013.01);
(Continued)

(58) Field of Classification Search
CPC ...... G06F 12/1027; G06F 9/467; G06F 9/544; G06F 12/0873; G06F 2212/151; G06F 2212/683
See application file for complete search history.

(56) References Cited

U.S. PATENT DOCUMENTS

2005/0198466 A1* 9/2005 Estlick ................ G06F 12/1027
711/207
2007/0250666 A1 10/2007 Sartorius et al.
(Continued)

FOREIGN PATENT DOCUMENTS

CN    101421706    4/2009
CN    103309644    9/2013
(Continued)

OTHER PUBLICATIONS

Robert Bedichek, "Some Efficient Architecture Simulation Techniques", Proceedings of the Winter 1990 USENIX Conference, Jan. 22-26, 1990, 12 pages.
(Continued)

*Primary Examiner* — Eric Cardwell
(74) *Attorney, Agent, or Firm* — Nixon & Vanderhye P.C.

(57) ABSTRACT

A data processing system (2) including one or more transaction buffers (16, 18, 20) storing address translation data executes translation buffer invalidation instructions TLBI within respective address translation contexts VMID, ASID, X. Translation buffer invalidation signals generated as a consequence of execution of the translation buffer invalidation instructions are broadcast to respective translation buffers and include signals which specify the address translation context of the translation buffer invalidation instruction that was executed. This address translation context specified within the translation buffer invalidation signals is used to gate whether or not those translation buffer invalidation signals when received by translation buffers which are
(Continued)

potential targets for the invalidation are or are not flushed. The address translation context data provided within the translation buffer invalidation signals may also be used to control whether or not local memory transactions for a local transactional memory access are or are not aborted upon receipt of the translation buffer invalidation signals.

8 Claims, 6 Drawing Sheets

(51) Int. Cl.
*G06F 9/46* (2006.01)
*G06F 9/54* (2006.01)
*G06F 12/0873* (2016.01)

(52) U.S. Cl.
CPC .... *G06F 12/0873* (2013.01); *G06F 2212/151* (2013.01); *G06F 2212/683* (2013.01)

(56) References Cited

U.S. PATENT DOCUMENTS

| | | | |
|---|---|---|---|
| 2008/0281563 A1* | 11/2008 | Ganai | G06F 30/3323 703/2 |
| 2014/0075151 A1 | 3/2014 | Cain, III et al. | |
| 2014/0115297 A1* | 4/2014 | Cain, III | G06F 12/1027 711/207 |
| 2015/0242319 A1* | 8/2015 | Evans | G06F 12/109 711/207 |
| 2016/0350225 A1 | 12/2016 | Podaima et al. | |
| 2016/0378160 A1* | 12/2016 | Muralidhar | G06F 1/3206 713/323 |
| 2017/0228233 A1* | 8/2017 | Mishaeli | G06F 9/485 |

FOREIGN PATENT DOCUMENTS

| | | |
|---|---|---|
| CN | 103777925 | 5/2014 |
| CN | 103778072 | 5/2014 |
| CN | 105320607 | 2/2016 |
| CN | 105975405 | 9/2016 |
| CN | 105980994 | 9/2016 |
| CN | 106293894 | 1/2017 |
| JP | 2017-517040 | 6/2017 |
| TW | I570565 | 2/2017 |

OTHER PUBLICATIONS

Extended European Search Report for EP Application No. 17386022.2 dated Nov. 20, 2017, 10 pages.
International Search Report and Written Opinion of the ISA for PCT/EP2018/064497 dated Jun. 20, 2018, 16 pages.
Office Action for EP Application No. 17386022.2 dated Sep. 12, 2019, 5 pages.
Office Action for IL Application No. 270987 dated Dec. 6, 2021, 3 pages.
Office Action for IN Application No. 202047000620 dated Mar. 8, 2022, 8 pages.
Office Action for TW Application No. 107121680 dated Mar. 25, 2022 and English translation, 17 pages.
Office Action for JP Application No. 2019-570895 dated Apr. 14, 2022 and English translation, 9 pages.
Office Action for JP Application No. 2019-570895 dated Oct. 18, 2022 and English translation, 9 pages.
Office Action for CN Application No. 201880041764.1 dated Feb. 4, 2023, 10 pages.

* cited by examiner

ADDRESS TRANSLATION DATA INVALIDATION

This application is the U.S. national phase of International Application No. PCT/EP2018/064497 filed Jun. 1, 2018 which designated the U.S. and claims priority to EP Application No. 17386022.2 filed Jun. 28, 2017, the entire contents of each of which are hereby incorporated by reference.

This disclosure relates to the field of data processing systems. More particularly, this disclosure relates to the invalidation of address translation data stored within data processing systems.

It is known to provide data processing systems which utilize address translation data to map received addresses to translated addresses. For example, a processor may execute instructions using a virtual address space and a local translation buffer may store address translation data to map received virtual addresses into translated physical addresses, or intermediate physical addresses (for example when a hypervisor is supporting the presence of multiple virtual machine execution environments). Within such systems, it is important that the address translation should not slow down the processing operations and accordingly one or more address translation buffers may be distributed throughout a system close to processing circuitry which will use that translation data in order that it is locally available within a low delay. However, when address translation data is distributed throughout a system, there arise coherency management issues for that data. The mechanisms which manage the coherency of the address translation data should themselves not constrain processing performance.

At least some example embodiments of the present disclosure provide apparatus for processing data comprising:
one or more translation buffers to store respective address translation data to map received addresses to translated addresses; and
processing circuitry to execute program instructions; wherein
said processing circuitry is responsive to a translation buffer invalidation instruction within a sequence of program instructions executing using a given address translation context to broadcast translation buffer invalidation signals to said one or more translation buffers, and
said translation buffer invalidation signals specify said given address translation context.

At least some example embodiments of the present disclosure provide apparatus for processing data comprising:
one or more translation buffers means for storing respective address translation data to map received addresses to translated addresses; and
processing means for executing program instructions; wherein
said processing means is responsive to a translation buffer invalidation instruction within a sequence of program instructions executing using a given address translation context to broadcast translation buffer invalidation signals to said one or more translation buffers, and
said translation buffer invalidation signals specify said given address translation context.

At least some embodiments of the present disclosure provide a method of processing data comprising:
storing within one of more translation buffers respective address translation data to map received addresses to translated addresses; and
executing program instructions; wherein
in response to a translation buffer invalidation instruction within a sequence of program instructions executing using a given address translation context, broadcasting translation buffer invalidation signals to said one or more translation buffers, and
said translation buffer invalidation signals specify said given address translation context.

At least some embodiments of the present disclosure provide a computer program for controlling a host data processing apparatus to provide an instruction execution environment comprising:
one or more translation buffer data structures to store respective address translation data to map received addresses to translated addresses; and
processing program logic to execute program instructions; wherein
said processing program logic is responsive to a translation buffer invalidation instruction within a sequence of program instructions executing using a given address translation context to broadcast translation buffer invalidation signals to said one or more translation buffer data structures, and
said translation buffer invalidation signals specify said given address translation context.

The computer program may be stored on a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates a data processing system including multiple processing elements utilizing local translation buffers;

FIG. 2 schematically illustrates a processing element and local translation buffer;

FIG. 3 schematically illustrates storing buffer context data for each program thread within a multithreaded processor;

FIG. 4 schematically illustrates address range tracking for a processing element being used to gate the action of translation buffer invalidation signals;

Figure 1:
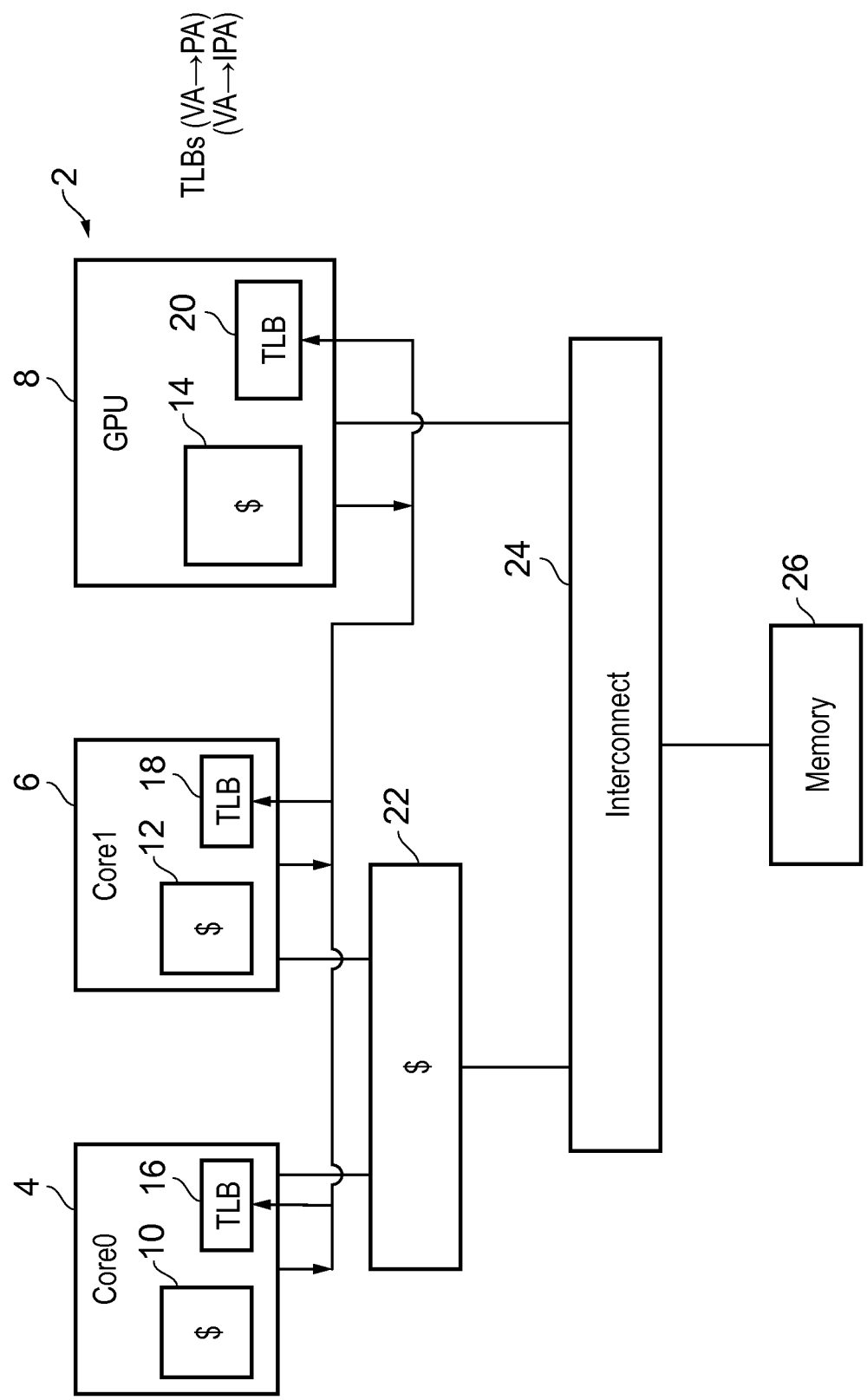

FIG. 1 schematically illustrates a data processing system 2 including a plurality of processing elements in the form of general purpose processors 4 and 6, and a graphics processing unit 8. Each of these processing elements 4, 6, 8 includes a local cache memory 10, 12, 14 and a local translation buffer in the form of a local translation lookaside buffer 16, 18, 20. The translation lookaside buffers 16, 18, 20 store respective address translation data which is used to map received addresses to translated addresses. The received addresses may be, for example, virtual addresses as used locally by the processing element 4, 6, 8 and are translated to address data as used within its local cache memory 10, 12, 14. The address translation data may map such virtual addresses to physical addresses PA or intermediate physical addresses IPA (for example in the case of a system using a hypervisor program to support multiple virtual machine execution environments).

The processing elements 4, 6, 8 use their local translation lookaside buffer 16, 18, 20 to convert received addresses to translated addresses (e.g. physical addresses) which are then issued via an interconnect 24 to other elements within the memory system hierarchy, such as a further cache memory 22 which is shared by the general purposes processors 4, 6, and a main shared memory 26.

The provision of the translation lookaside buffers 16, 18, 20 locally within each of the processing elements 4, 6, 8 allows these processing elements to perform address mapping at high speed and with low latency if the translation data is present within the translation lookaside buffer 16, 18 and 20. The translation lookaside buffers 16, 18, 20 may often form part of critical paths within the processing elements of which they form part such that it is important that the translation lookaside buffer 16, 18, 20 should operate quickly and efficiently otherwise the overall performance of their associated processing element 4, 6, 8 may be degraded.

The address translation data used within different portions of the data processing system 2 is managed to provide consistent overall control of the memory mapping applied by different parts of the data processing system to ensure consistency and data integrity. Mapping data may often be modified during use. In order to ensure consistency between different copies of address translation data held locally within different translation lookaside buffers 16, 18, 20, there is provided a translation buffer invalidation instruction which may be executed by any of the processing elements 4, 6, 8 within its sequence of program instructions. When such a translation buffer invalidation instruction is executed, then translation buffer invalidation signals are broadcast to the translation lookaside buffers 16, 18, 20 within the system and to selectively trigger invalidation of address translation data held within those distributed translation lookaside buffers 16, 18, 20.

The translation buffer invalidation instruction which is executed is part of a sequence of program instructions being executed by a given one of the processing elements 4, 6, 8 within an address translation context of that processing element 4, 6, 8 which is executing the translation buffer invalidation instruction. The address translation context within which the translation buffer invalidation instruction is executed includes which virtual machine execution environment is currently active on that processing element, and which program thread is currently active on that processing element utilizing its own address space. Accordingly, the address translation context of a given processing element 4, 6, 8 at any given time may be represented with variables including a virtual machine identifier (VMID) which identifies a virtual machine execution context among a plurality of virtual machine execution context which may be executed by the processing element 4, 6, 8 concerned. The variables specifying the address translation context may further include an address space identifier (ASID) identifying a given process among a plurality of processes which may be executed by the processing element 4, 6, 8 concerned and may include within the thread the translation buffer invalidation instruction.

The execution of the translation buffer invalidation instruction by one of the processing elements 4, 6, 8 within the address translation context active at that particular time for the instruction gives rise to the broadcasting of translation buffer invalidation signals which specify the address translation context within which that translation buffer validation instruction was executed. Including within the translation buffer invalidation signals is data specifying the address translation context of the originating translation buffer invalidation instruction. This allows the translation lookaside buffers 16, 18, 20 to gate whether or not those translation buffer invalidation signals trigger flushing (partial or complete) of the address translation data which they store in dependence upon a match or otherwise between the address translation context from which the translation buffer invalidation signals originate against the local context of the translation lookaside buffer 16, 18, 20 at the given point in time at which it receives those translation invalidation signals. This can avoid unnecessarily removing address translation data when it is not required to maintain consistency and so avoid degrading performance, such as by requiring translation lookaside buffer refills and/or transactional memory transaction aborts, as a consequence of address translation data flushes which were not actually necessary.

Figure 2:
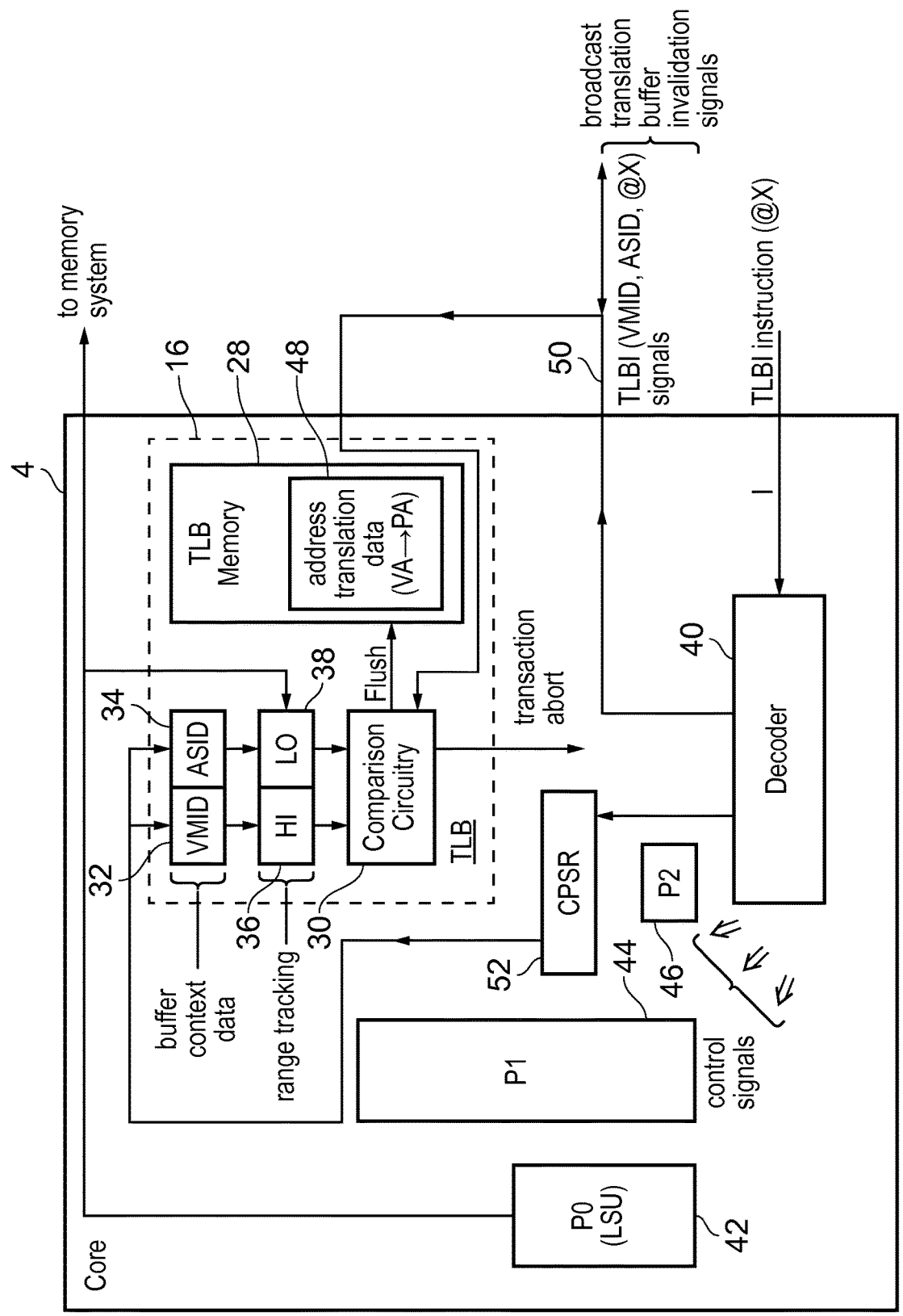

FIG. 2 schematically illustrates a processing element in the form of a general purpose processor 4 which includes a translation lookaside buffer 16 including a translation lookaside buffer memory 28, comparison circuitry 30 and registers 32, 34, 36 and 38 storing buffer context data in the form of a virtual machine identifier VMID, an address space identifier ASID, a high accessed value HI and a low accessed value LO. The general purpose processor 4 receives program instructions to be executed from within a sequence of program instructions at an instruction decoder 40 where those program instructions are decoded to produce control signals which then control the operation of multiple execution pipelines 42, 44, 46. These execution pipelines include a load store pipeline 42 which is responsible for executing program instructions performing memory accesses (load instructions and store instructions) and which utilizes address translation data 48 stored within the translation lookaside buffer memory 28 of the translation lookaside buffer 16.

When the general purpose processor 4 receives a translation buffer invalidation instruction TLBI at the instruction decoder 40, then this serves to generate translation buffer invalidation signals on signal line 50 which are broadcast to both its own translation lookaside buffer 16 and any other translation lookaside buffers 18, 20 within the data processing system 2. The translation lookaside buffer invalidation instruction TLBI specifies as an argument X an address value of a translation lookaside buffer entry which is being invalidated.

The general purpose processor 4 includes a current program status register 52 which stores data representing a current state of the general purpose processor 4. This current state includes a current virtual machine identifier for the general purpose processor 4 indicating which of a plurality of virtual machine execution contents are currently active (corresponding to the sequence of program instructions currently being executed) within the general purpose processor 4. The current program status register 52 further specifies a currently active process executing among a plurality of processes using a address space identifier ASID associated with that process.

The virtual machine identifier VMID and the process identifier ASID stored within the current program status register 52 together represent part of the address translation context associated with the translation lookaside buffer instruction TLBI which is decoded and is to be executed. The translation buffer invalidation signals which are broadcast on signal line 50 include signals which specify the virtual machine identifier VMID, the address space identifier ASID and the target received address value X for which the address translation data is to be invalidated. Thus, the translation buffer invalidation signals specify address translation context associated with the executed translation buffer invalidation instruction TLBI.

The broadcast translation buffer invalidation signals are sent to the translation lookaside buffers 16, 18, 20 within the system and are supplied to the comparison circuitry 30 within those respective translation lookaside buffers 16, 18, 20. The comparison circuitry determines whether the buffer context data associated with the address translation data 48 stored within the translation lookaside buffer 16, 18, 20 concerned matches that specified with the translation buffer invalidation signals. If the virtual machine identifier VMID of the buffer context data matches the virtual machine identifier specified within the translation buffer invalidation signals and the address space identifier ASID of the buffer context data also matches the address space identifier of the translation buffer invalidation signals, then the comparison circuitry 30 permits flushing of the address translation data 48 from its local translation lookaside buffer memory 28. Such flushing may take a variety of different forms, such as marking the stored data as invalid. If the buffer context data (VMID, ASID) does not match the address translation context associated with the received translation buffer invalidation signals, then the comparison circuitry 30 inhibits flushing of the address translation data 48 as the invalidation operation is not necessary for that locally held address translation data 48.

At least some of the processing elements, including the general purpose processors 4, 6, support transactional memory accesses. Such transactional memory accesses provide transactions comprising program instructions which are bounded by respective transaction start points and transaction commit points. Such transactions are atomically executed in the sense that if they are aborted prior to reaching the transaction commit point, then the apparatus is returned to a state corresponding to the transaction start point. Such transactional memory accesses are useful in improving system performance when utilizing shared memory by avoiding, for example, the need to use explicitly set and reset memory locks.

One situation which may trigger a memory access transaction to be aborted within such systems is when the address translation data stored within a local translation lookaside buffer 16, 18, 20 is inappropriately changed. The present disclosure provides range tracking circuitry 36, 38 in the form of registers which track a minimum address value LO and a maximum address value HI accessed by the processing element 4 during use of given address translation data 48 stored within the local translation lookaside buffer 16 concerned. When the local translation lookaside buffer 16 is flushed, then the maximum address value HI and the minimum address value LO are reset respectively to values representing the lowest point within the address space range and the highest point within the address space range. Each time an address access is subsequently made, the maximum value stored within the register 36 is compared with the current address value and the value stored within the register 36 is updated to the current address value if that current address value is higher in the address space range than the currently stored value for HI. In a similar way, the minimum address value LO is compared with a currently used address value and the stored minimum address value LO is updated to the current address value if the current address value is lower in the memory address space than the currently stored minimum address value LO. Thus, the registers 36, 38 store range tracking values tracking an address range within which any memory accesses associated with a currently pending transaction of the translational memory are located.

When translation buffer invalidation signals are received at a given translation lookaside buffer 16, the local comparison circuitry 30 compares the target received address value X for which the address translation data is to be invalidated with the range tracking values HI, LO tracking the address space range within the total address space which has been used by that processing element. If the result of the comparison made is that the target received address X, or a target received address range, are outside the range bounded by the minimum address value LO and the maximum address value HI (an active address range of the local processor), then the processing element 4 concerned continues with any pending translations of the transactional memory as such transactions are not influenced by the address translation invalidation being signalled by the translation buffer invalidation signals. When both the given buffer context data VMID, ASID stored within the registers 32, 34 match the received address translation context VMID and ASID, and the received target address value X lies within the range bounded by the minimum address value LO and the maximum address value HI, the comparison circuitry 30 issues a signal which aborts any pending memory transactions within that local processing element 4. Such a memory transaction abort triggers a return to a state corresponding to the associated transaction start point.

Figure 3:
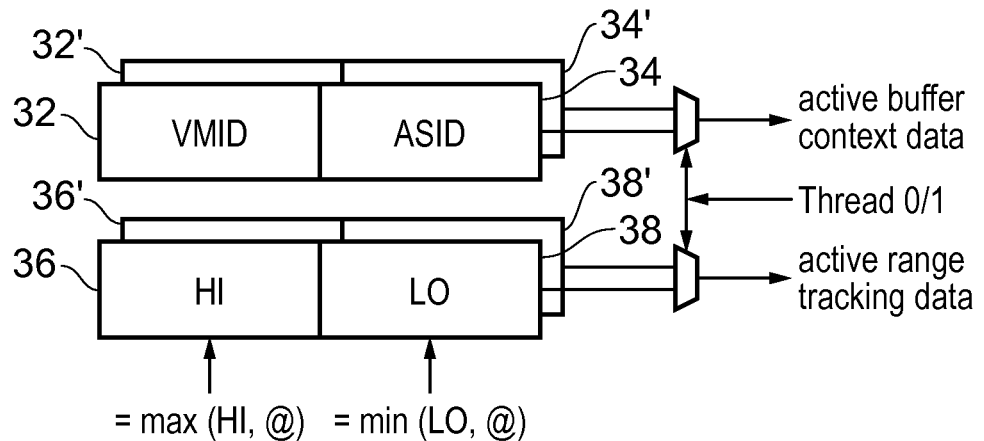

A given processing element 4, 6, 8 may support interleaved execution of a plurality of program threads (e.g. within an SMT processor). Each of these program threads may have its own address translation context. These address translation contexts are represented by the VMID, ASID, HI and LO values stored within the translation lookaside buffers 16, 18, 20. FIG. 3 schematically illustrates how multiple registers 32, 32', 34, 34', 36, 36', 38, 38' may be used to store multiple local address translation contents associated with the address translation data 48 stored within the address translation buffer memory 28. A thread indicating signal indicating whether a thread0 or a thread1 is currently active is used to switch multiplexers to select which of these address translation contexts is to be used for comparison with the address translation context identifying signals with received translation buffer invalidation signals.

Figure 4:
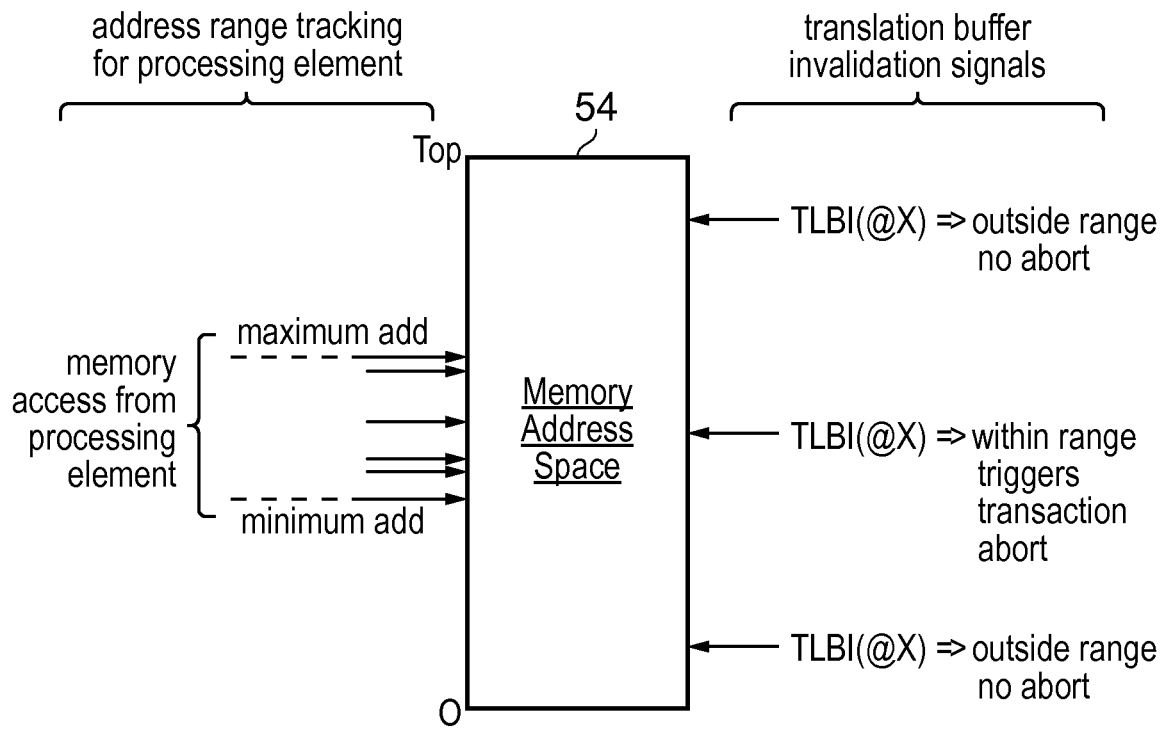

FIG. 4 schematically illustrates how address range tracking for a processing element may be used to gate translation buffer invalidation signals. The memory address space 54 of the system extends from zero to a top address value. Memory accesses performed by the processing element concerned since the last translation lookaside buffer flush are tracked by the range tracking circuitry using the registers 36, 38 whereby as each memory access is performed it is compared with the currently stored minimum address value and maximum address value of the range noted as having been accessed. The stored values of HI and LO are updated as necessary if the newly received memory address value lies outside of the currently tracked range. This behaviour is illustrated on the left hand side of FIG. 4.

The right hand side of FIG. 4 indicates received translation buffer invalidation signals which specify respective target addresses for the invalidation operation. If these target addresses are outside of the currently tracked memory address range, then the translation buffer invalidation signals do not give rise to any aborts of pending memory access transactions of the local processing element. However, if the translation buffer invalidation signals specify a target address that lies within the range of addresses currently being tracked having been used since the last TLB flush, then this does trigger memory transaction aborts for any pending memory transactions of the local processing element 4.

Figure 5:
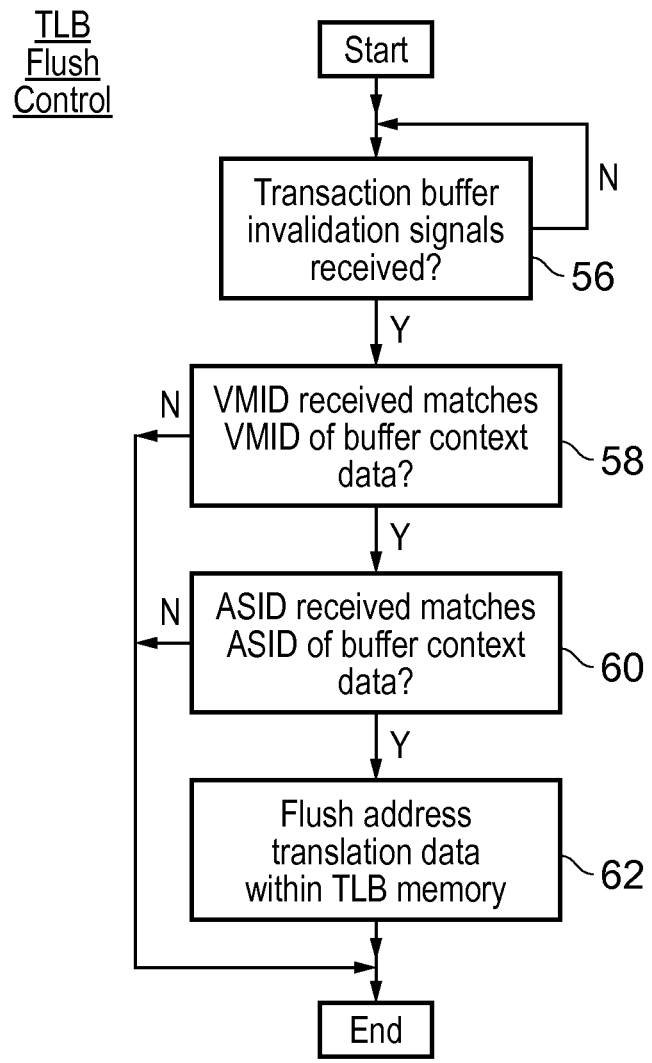
FIG. 5 is a flow diagram schematically illustrating translation lookaside buffer flush control.

FIG. 5 is a flow diagram schematically illustrating translation lookaside buffer flush control. Processing waits at step 56 until translation buffer invalidation signals are received. Step 58 compares the VMID value received in the translation buffer invalidation signals with the VMID value held within register 32 as part of the buffer context data of the translation lookaside buffer concerned. If there is no match, then the flush is not performed and processing proceeds to the end. If there is a match, then step 60 serves to compare the received address space identifier value ASID indicating the active process included the translation buffer invalidation instruction giving rise to the translation buffer invalidation signals against the buffer context data, and in particular the ASID value stored within register 34. If there is no match, then the process again terminates. However, if there is a match at both steps 58 and 60, then processing reaches step 62 at which the address translation data 48 within the translation lookaside buffer 28 is flushed (e.g. marked as invalid).

Figure 6:
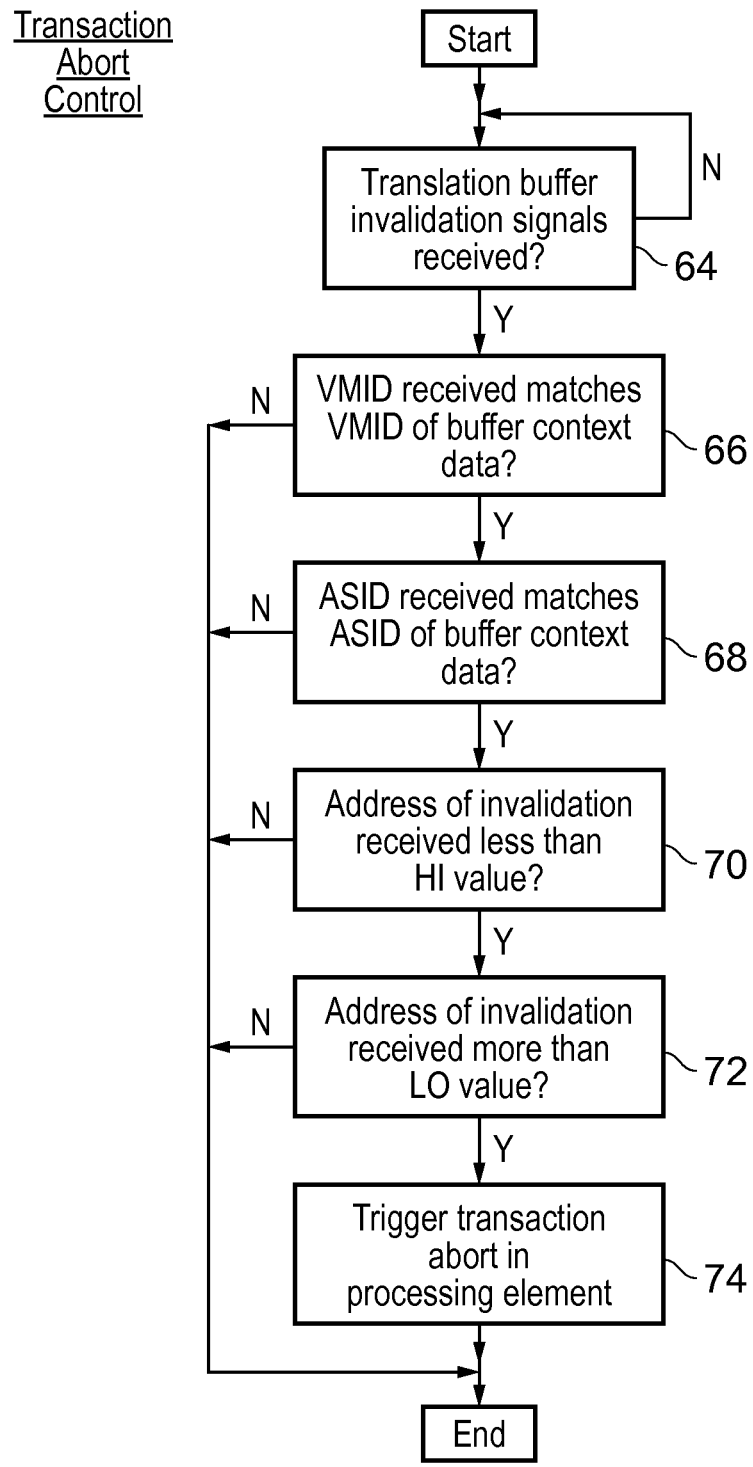
FIG. 6 is a flow diagram schematically illustrating transaction abort control.

FIG. 6 is a flow diagram schematically illustrating transaction abort control. Processing waits at step 64 for translation buffer invalidation signals to be received. Steps 66 and 68 again serve to check for a match between the received VMID signals representing the virtual machine identifier and the ASID signals representing the process of the originating transaction buffer invalidation instruction against the buffer context data of the local translation lookaside buffer. If these do not both match, then the processing proceeds to the end and no transaction abort is performed. However, if both the VMID and the ASID match, then processing reaches step 70 at which a comparison is made between the target address X of the received translation buffer invalidation signals and the currently stored maximum address value stored within the register 36. If the received address is less than maximum stored value HI, then processing proceeds to step 72. If the received address is more than the stored HI value, then the target address lies outside of the range of addresses which have been accessed using the address translation data 48 and accordingly no abort is necessary. At step 72 the received target address specified by the translation buffer invalidation signals is compared with the stored minimum address value LO. If the received address value is less than the stored minimum value LO, then a transaction is not performed and the processing again terminates. However, if both steps 70 and 72 are passed indicating that the received target address lies within the tracked range of memory addresses which have been accessed using the translation lookaside buffer 48 concerned, then it is possible that one of the pending memory transactions would be dependent upon the address translation data which has been indicated to be invalidated and accordingly step 74 serves to trigger transaction aborts of all pending memory transactions within the local processing element 4. It will be appreciated that the address translation data is also invalidated in accordance with the flow diagram of FIG. 5.

Figure 7:
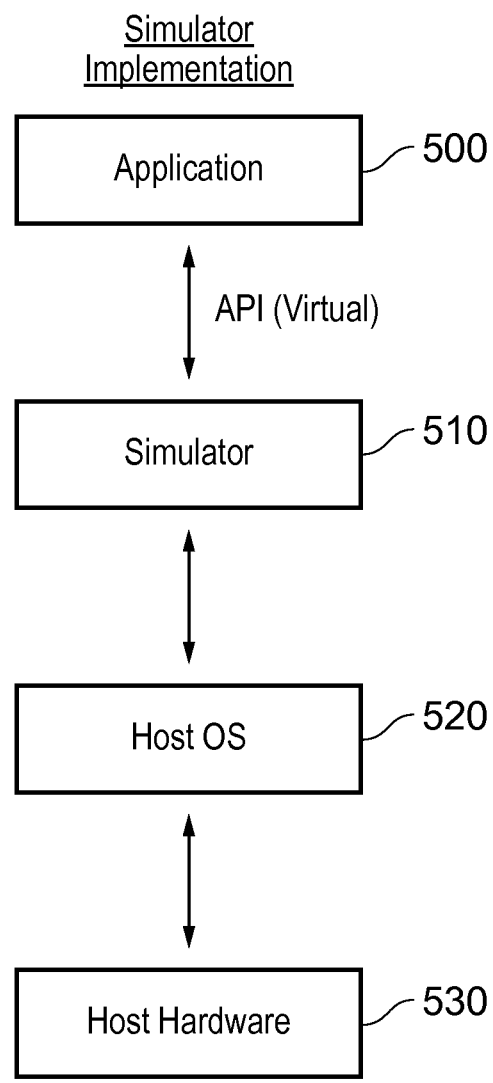
FIG. 7 schematically illustrates a simulator implementation of the present techniques.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 530, optionally running a host operating system 520, supporting the simulator program 510. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 530), some simulated embodiments may make use of the host hardware, where suitable.

The simulator program 510 may be stored on a computer-readable storage medium (which may be a non-transitory medium), and provides a program interface (instruction execution environment) to the target code 500 (which may include the applications, operating systems and hypervisor) which is the same as the application program interface of the hardware architecture being modelled by the simulator program 510. Thus, the program instructions of the target code 500, including the control of memory accesses based on the realm protection functionality described above, may be executed from within the instruction execution environment using the simulator program 510, so that a host computer 530 which does not actually have the hardware features of the apparatus 2 discussed above can emulate these features.

At least some examples provide a virtual machine providing an execution environment operating in accordance with a method comprising: storing within one of more translation buffers respective address translation data to map received addresses to translated addresses; and executing program instructions; wherein in response to a translation buffer invalidation instruction within a sequence of program instructions executing using a given address translation context, broadcasting translation buffer invalidation signals to said one or more translation buffers, and said translation buffer invalidation signals specify said given address translation context. A storage medium may store the virtual machine computer program. The storage medium may be a non-transitory storage medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   one or more translation buffers to store respective address translation data to map received addresses to translated addresses; and
   processing circuitry to execute program instructions; wherein
   said processing circuitry is responsive to a translation buffer invalidation instruction within a sequence of program instructions executing using a given address translation context to broadcast translation buffer invalidation signals to said one or more translation buffers, wherein the given address translation context comprises at least one of:
      a virtual machine execution context; and
      a given process from among a plurality of processes having respective address space translation mappings;
   said translation buffer invalidation signals specify at least one of a virtual machine identifier indicative of the virtual machine execution context and an address space identifier indicative of the given process;
   a given translation buffer among said one or more translation buffers is configured to store given buffer context data specifying an address translation context of given address translation data stored within said given translation buffer;
   the apparatus comprises context comparison circuitry associated with said given translation buffer to perform a comparison of said given buffer context data with said virtual machine identifier and/or said address space identifier;
   said processing circuitry comprises a processing element to use said given address translation data stored within said given translation buffer;
   said given buffer context data is associated with a currently active program thread on the processing element;
   said processing element is configured to support transactional memory accesses where a transaction comprising program instructions bounded by a transaction start point and a transaction commit point is atomically executable and can be aborted prior to reaching said transaction commit point and can return said apparatus to a state corresponding to said transaction start point;
   said processing element is configured to selectively abort a pending transaction in dependence upon said comparison of said given buffer context data associated with the currently active program thread with said virtual machine identifier and/or said address space identifier; and
   said processing element is configured to continue with said pending transaction when said given buffer context data differs from said virtual machine identifier and/or said address space identifier.

2. Apparatus as claimed in claim 1, wherein
   when said given buffer context data matches said given address translation context, said comparison circuitry is configured to permit flushing of said given address translation data, and
   when said given buffer context data differs from said given address translation context, said comparison circuitry is configured to inhibit flushing of said given address translation data.

3. Apparatus as claimed in claim 1, wherein said processing element comprises one of a general purpose processor and a graphics processor.

4. Apparatus as claimed in claim 1, wherein said address translation data provides one of:
   a mapping of virtual addresses to physical addresses; and
   a mapping of virtual addresses to intermediate physical addresses.

5. Apparatus as claimed in claim 1, wherein said one or more translation buffers comprise one or more translation lookaside buffers.

6. Apparatus for processing data comprising:
   one or more translation buffers to store respective address translation data to map received addresses to translated addresses; and
   processing circuitry to execute program instructions; wherein
   said processing circuitry is responsive to a translation buffer invalidation instruction within a sequence of program instructions executing using a given address translation context to broadcast translation buffer invalidation signals to said one or more translation buffers, wherein the given address translation context comprises at least one of:
      a virtual machine execution context; and
      a given process from among a plurality of processes having respective address space translation mappings;
   said translation buffer invalidation signals specify at least one of a virtual machine identifier indicative of the virtual machine execution context and an address space identifier indicative of the given process;
   a given translation buffer among said one or more translation buffers is configured to store given buffer context data specifying an address translation context of given address translation data stored within said given translation buffer;
   the apparatus comprises context comparison circuitry associated with said given translation buffer to perform a comparison of said given buffer context data with said virtual machine identifier and/or said address space identifier;
   said processing circuitry comprises a processing element to use said given address translation data stored within said given translation buffer;
   said processing element is configured to support transactional memory accesses where a transaction comprising program instructions bounded by a transaction start point and a transaction commit point is atomically executable and can be aborted prior to reaching said transaction commit point and can return said apparatus to a state corresponding to said transaction start point;
   said processing element is configured to selectively abort a pending transaction in dependence upon said comparison of said given buffer context data with said virtual machine identifier and/or said address space identifier; and said processing element is configured to continue with said pending transaction when said given buffer context data differs from said virtual machine identifier and/or said address space identifier, wherein said translation buffer invalidation signals specify one or more target received address values for which address translation data is to be invalidated;

said given translation buffer comprises range tracking circuitry to track a minimum address value and a maximum address value accessed by said processing element during use of said given translation data stored within said given translation buffer, and said processing element is configured to continue with said pending transaction when said one or more target received address values are outside a range bounded by said minimum address value and said maximum address value.

7. Apparatus as claimed in claim 6, wherein said processing element is configured to abort said pending transaction when both said given buffer context data matches said given address translation context and said one or more target received address values are within a range bounded by said minimum address value and said maximum address value.

8. Apparatus for processing data comprising:

one or more translation buffers to store respective address translation data to map received addresses to translated addresses; and processing circuitry to execute program instructions; wherein said processing circuitry is responsive to a translation buffer invalidation instruction within a sequence of program instructions executing using a given address translation context to broadcast translation buffer invalidation signals to said one or more translation buffers, wherein the given address translation context comprises at least one of:

a virtual machine execution context; and a given process from among a plurality of processes having respective address space translation mappings;

said translation buffer invalidation signals specify at least one of a virtual machine identifier indicative of the virtual machine execution context and an address space identifier indicative of the given process;

a given translation buffer among said one or more translation buffers is configured to store given buffer context data specifying an address translation context of given address translation data stored within said given translation buffer;

the apparatus comprises context comparison circuitry associated with said given translation buffer to perform a comparison of said given buffer context data with said virtual machine identifier and/or said address space identifier;

said processing circuitry comprises a processing element to use said given address translation data stored within said given translation buffer;

said processing element is configured to support transactional memory accesses where a transaction comprising program instructions bounded by a transaction start point and a transaction commit point is atomically executable and can be aborted prior to reaching said transaction commit point and can return said apparatus to a state corresponding to said transaction start point;

said processing element is configured to selectively abort a pending transaction in dependence upon said comparison of said given buffer context data with said virtual machine identifier and/or said address space identifier; and said processing element is configured to continue with said pending transaction when said given buffer context data differs from said virtual machine identifier and/or said address space identifier;

wherein said processing element is configured to support interleaved execution of a plurality of program threads and said given translation buffer stores, for each of said plurality of program threads, given buffer context data.

* * * * *